United States Patent [19]
Bickford et al.

[11] Patent Number: 4,810,680
[45] Date of Patent: Mar. 7, 1989

[54] PREPARATION OF HIGH PURITY, HOMOGENEOUS ZIRCONIA MIXTURES

[75] Inventors: Fred A. Bickford, Painted Post; Warren M. Wise, Corning, both of N.Y.

[73] Assignee: Corning Glass Works, Corning, N.Y.

[21] Appl. No.: 103,962

[22] Filed: Oct. 5, 1987

Related U.S. Application Data

[63] Continuation-in-part of Ser. No. 879,078, Jun. 26, 1986, abandoned.

[51] Int. Cl.$^4$ .................... C04B 35/48; C01G 25/02
[52] U.S. Cl. ..................... 501/103; 501/104; 501/152; 423/71; 423/85; 423/608
[58] Field of Search ............ 501/103, 104, 152; 423/608, 71, 85

[56] References Cited

U.S. PATENT DOCUMENTS 3,312,631  4/1967  Smith ........................... 423/608
4,501,818  2/1985  Rossi ............................ 501/103

FOREIGN PATENT DOCUMENTS 107969    6/1984  Japan.
127240    7/1985  Japan.
60-215527 10/1985  Japan.

OTHER PUBLICATIONS

"Wet Chemical Preparation of Zirconia Powders: Their Microstructure and Behavior," M.A.C.G. Van de Graaf and A. J. Burggraaf, p. 744.
"Microstructural Development During Pressing and Sintering of Ultra Fine Zirconia Powders," M.A.C.G. Van de Graaf et al., Ceramic Powders, p. 783 (1978).
"Technique for Preparing Highly Sinterable Oxide Powders," Dole et al., 32 Materials Science and Engineering, 277 (1978).
"The Preparation of Zirconia Powders," C. J. Norman and S. L. Jones, Convention Papers.
"Characteristics and Sintering Behavior of Zirconia Ultra-Fine Powders," K. Haberko, 5 Ceramurgia Int., 148 (1979).

*Primary Examiner*—William R. Dixon, Jr.
*Assistant Examiner*—Anthony J. Green
*Attorney, Agent, or Firm*—Norman L. Norris; Dianne B. Elderkin; Richard N. Wardell

[57] ABSTRACT

A method is provided of preparing high-purity mixtures of zirconia and another metal oxide substantially free of sodium oxide impurity. Trioxydizirconium ion and a salt of another metal in an aqueous solution are added to a highly basic solution, resulting in the homogeneous precipitation of the combined hydroxides or hydrous oxides. The precipitate is recovered, washed with the water and then with an organic solvent, and then dried, most preferably employing an azeotropic distillation procedure. The resulting material is then calcined to provide a mixture of zirconia with the other metal oxide. In a preferred embodiment, the zirconia mixtures are in the form of fine powders which can be sintered to form a product having greater than 99% of its theoretical density.

38 Claims, No Drawings

PREPARATION OF HIGH PURITY, HOMOGENEOUS ZIRCONIA MIXTURES

BACKGROUND OF THE INVENTION

This application is a continuation-in-part of U.S. Ser. No. 879,078, filed June 26, 1986, and now abandoned.

This invention relates to a process for the preparation of mixtures of zirconia and another metal oxide from a zirconium salt and another metal salt. More particularly, the invention relates to the preparation of such zirconium mixtures by controlled precipitation through which impurities that may inhere in the starting zirconium salt are excluded from the zirconium product, and through which a substantially homogeneous mixture is provided.

Mixtures of zirconia and other refractory metallic oxides, such as alumina, silica, or titania, are used in the preparation of ceramic or refractory articles having such diverse applications as catalyst supports, filters, nozzles, protective linings, etc. Mixtures of zirconia with certain metallic oxides, most notably yttria, calcia, or magnesia, are particularly useful since those oxides can "stabilize" the zirconia, at least partially, in its tetragonal crystalline form. Because of the sharp volume change undergone by unstabilized zirconia during its monoclinic/tetragonal crystalline transformation, its use is generally limited to applications in which the zirconia articles are not exposed to temperature fluctuations through the range at which this transformation occurs. Stabilization minimizes the effects of this transformation, making the zirconia useful through a wider range of temperatures.

The raw material ores, minerals, or other substances from which commercial grade zirconia is produced, however, normally contain extraneous materials which, if present even in minor amounts, can adversely affect the properties of final products of stabilized zirconia. For example, zirconia prepared from zircon (zirconium silicate) can contain up to about 1-1.5% by weight silica, which can interfere with stabilization of the zirconia. A widely available commercial source of zirconia is carbonated hydrous zirconia ("CHZ"), which is processed from zircon. Although that processing lowers the free silica content of the resultant CHZ, it leaves sodium oxide ($Na_2O$) as an impurity in amounts of about 0.5% by weight. Although not necessarily harmful in other industries, the presence of $Na_2O$ in refractory zirconia products, generally in the form of sodium silicate, can result in flaws in the crystalline structure of the stabilized zirconia forms. Accordingly, the zirconia produced for refractory purposes from these sources must be further treated to remove the inherent impurities.

Preparation of zirconia by precipitation of a zirconium-containing compound from an acidic aqueous solution has been practiced in the prior art. In many such preparations, however, the precipitate is in the form of a gel, with most of the original impurity present, and filtration and washing of the gel is difficult. Precipitation of mixed hydroxide gels of zirconium and other metals has been achieved by dripping dilute ammonium hydroxide solution into acid solutions of the metals. The gels were calcined to provide the mixed oxides themselves. Dole et al., *Materials Science and Engineering*, Vol. 32, 277 (1978). It has also previously been known that zirconia products can be prepared by controlled precipitation of an insoluble salt from a solution, and it is, in particular, known that yttria-stabilized zirconia can be prepared by co-precipitation of the hydroxides or hydrous oxides of the two metals in the form of a gel, followed by calcining the gel. See, for example, K. Haberko, *Ceramurgia Int.* 5, 148 (1979).

In the prior art, ceramic or refractory articles made from particulate zirconium mixtures are normally prepared by mixing powders of the separate oxide components, compacting and molding the mixed powders (normally with the aid of a temporary, plasticizing binder) into a "green" shape, and then heating or firing the green shape to sinter and densify the material, thereby forming the final article of the desired shape. In such an operation, it is advantageous for the powder mixtures to be substantially completely homogeneous so that the sintered article is of homogeneous composition throughout. If the powder particles themselves are each of substantially the same composition, containing all the metallic oxide components of the mixture in their proportionate amounts, homogeneity of the final article can be more easily attained. Additionally, powder particles capable of being sintered to a density substantially equivalent to their theoretical density (based on the particular composition of the particles) are also desirable because of the additional density and strength imparted thereby to the final article.

These desired characteristics of substantial purity, homogeneity, and attainment of high sintered density, and others, are provided by the various embodiments of the present invention.

SUMMARY OF THE INVENTION

The present invention provides a process for the preparation of mixtures of zirconia with at least one other metal oxide. The process comprises providing a first solution of (i) an aqueous solution of ammonium hydroxide having a molarity of at least about 5.0, and optionally (ii) a water-miscible organic solvent; providing trioxydizirconium ion ($Zr_2O_3^{+2}$) and at least one other metal salt in a second aqueous solution; adding the second solution to the first solution to precipitate substantially all the zirconium and the other metal in the form of their hydroxides; recovering the precipitated material; and calcining the material, thereby generating the zirconia and the other metal oxide from the hydroxides. These steps are preferably performed in a continuous sequence. Trioxydizirconium ion may be obtained from a number of starting materials; however, the most convenient source is CHZ which dissociates to trioxydizirconium ion on dissolution in an aqueous acidic solution. The zirconia mixture thus formed is homogeneous and contains less that 0.01% by weight, based on the zirconia weight, of sodium oxide impurity.

In a preferred embodiment, the precipitate is dried and then formed into a powder as part of the recovery step, providing, after calcining, a particulate mixture of zirconia and the additional metal oxide. In a most preferred procedure, the precipitate is dried by removing the water through an azeotropic evaporation or distillation. In this procedure, the precipitate is filtered, washed with water to remove soluble salts, then washed with a water-miscible organic solvent such as methanol, ethanol, 2-propanol or acetone, preferably followed by washing with either toluene or xylene, to remove sorbed water. After this, the precipitate is dispersed in an organic solvent that forms a low-boiling azeotrope with water, and heated to remove the water/solvent mixture. Best results have been achieved using either toluene or xylene as the azeotrope-forming solvent. The resulting zirconium mixture is in the form of a fine, substantially dry, particulate solid having a primary particle size less than about 100 angstroms (A), generally in the range of about 50 A. Therefore, the need to mill or grind the solid into a fine powder is thereby eliminated, an important aspect of the invention since milling or grinding is expensive and almost unavoidably introduces impurities into the powder Further, the powder formed using the distillation procedure is, after calcining, capable of sintering to a product having greater than 99.0% of its theoretical density. Most powders produced according to the prior art provide sintering to a level of 98-99% of theoretical density. However, additional increases in density, over 99%, provide disproportionately large increases in strength and structural integrity to the final products, making the incremental increase in density highly desirable.

The process of this invention, therefore, provides a means for producing high-purity mixtures of zirconia from sources such as the abundant and relatively inexpensive CHZ. Homogeneous mixtures of zirconia powders are produced which can be used directly in the further production of ceramic or refractory articles without the need for purification and without the need for post-blending other metal oxides with pre-formed zirconia powder as had been the common practice in the past. In a preferred embodiment, the process provides the zirconium mixtures in the form of a fine powder, without the need for grinding or milling, having excellent sintering capability.

DETAILED DESCRIPTION OF THE INVENTION

In the process of the invention, trioxydizirconium ion and another metal salt in a homogeneous solution are slowly added to a highly basic solution of ammonium hydroxide, resulting in the homogeneous precipitation of the zirconium and other metal in the form of their hydroxides. The preferred source of trioxydizirconium ion is CHZ. As those skilled in the art will appreciate, CHZ itself does not exist in dissociated form in an acidic solution, but rather when the CHZ is added to an aqueous acidic medium, the compound dissociates to trioxydizirconium ions, which remain in solution, and carbon dioxide, which substantially escapes in the form of a gas.

Other salts containing Zr(IV) can be used as the source of trioxydizirconium ion for use in the method of this invention. It has been found that when zirconium oxychloride ($ZrOlC_2.H_2O$) or zirconium tetrachloride ($ZrCl_4$), after being hydrolyzed, are dissolved in water, the zirconium exists as the hydroxyzirconyl ion $ZrO(OH)^+$. This hydroxyzirconyl ion can, however, be converted to the desired trioxydizirconium ion in one of two ways. One way to convert the ions to trioxydizirconium ions is to evaporate to dryness a solution of the zirconium oxychloride or zirconium tetrachloride. This evaporation should be performed at temperatures not exceeding steam bath temperatures. At higher temperatures, water insoluble $ZrO_2$ can be formed also resulting in the loss of zirconium as $ZrCl_4$ by the following reaction:

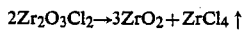

For final products of the highest density, the salts remaining following evaporation are dissolved in water and the resulting solution is evaporated to dryness a second time. Following the evaporation step, the salts are dissolved in water and used in the process of this invention. This solution should not be too concentrated and should be well mixed.

A second method for converting hydroxyzirconyl ion to the desired trioxydizirconium ion is by treating a solution of the hydroxyzirconyl ion with ammonium carbonate, $(NH_4)_2CO_3$, to adjust the pH of the solution to about 1. For final products of the highest density, the ammonium carbonate treated solution is then evaporated to dryness, as discussed above, prior to use in the process of this invention.

Thus, the trioxydizirconium ion may be provided in solution in a number of ways. The solution may result from dissolving CHZ and the at least one other metal salt in an acidic aqueous solution. Alternatively, the trioxydizirconium ion may be formed by treating an aqueous solution of a Zr(IV) salt such as zirconiumoxychloride or hydrolyzed zirconium tetrachloride with ammonium carbonate or by evaporation, or by a combination of the two. In any of these methods, the solution of Zr(IV) salt alone may be treated, with the at least one other metal salt being added subsequent to such treatment, or the solution to be treated may comprise both the Zr(IV) and the at least one other metal salt. It is understood that other methods for preparing the trioxydizirconium ion solutions used in the process of this invention may be used, and that it is not intended for this invention to be limited to the methods described above.

For final calcined products of the highest density, it has been found that excess acid in the solution of trioxydizirconium ion should be removed prior to addition to the aqueous $NH_4OH$ solution. This can be done by the evaporation or pH adjustment methods discussed above. When zirconium oxychloride, for example, is used as the zirconia source and is treated by the methods described above, removal of excess acid occurs as the hydroxyzirconyl ion in the solution is converted to the desired trioxydizirconium ion. Even when CHZ is used as the zirconia source, removal of excess acid, e.g. by evaporation of the aqueous acidic solution of CHZ to dryness, has been found to be advantageous. Along with removing excess acid, such evaporation converts hydroxyzirconyl ion in the solution to the desired trioxydizirconium ion.

For best results, it has also been found that the concentration of Zr(IV) in the second aqueous solution should not be too high. Therefore, the amount of Zr(IV) is preferably no greater than about 11 weight-/volume % of said second aqueous solution.

Broadly, the invention proceeds from a highly basic solution of ammonium hydroxide, generally having a pH greater than about 12, into which is added trioxydizirconium ions and ions of another metal salt in a second aqueous solution. Upon contact with the ammonium hydroxide solution, the trioxydizirconium ions and other metal ions encounter a pH sufficiently high to rapidly and homogeneously precipitate the metals in the form of their hydroxides. As used herein, the term "hydroxide" when used with reference to a metal is intended to cover the form of compound known as the hydrous metal oxide, where applicable, as well. For example, zirconium may precipitate in the form of hydrous zirconia rather than its formulary equivalent, zirconium hydroxide. The impurities present in the original zirconium compound, notably sodium oxide, are not trapped by the precipitating material, do not precipitate themselves, and remain substantially in solution.

The highly basic solution of ammonium hydroxide consists essentially of an aqueous solution of ammonium hydroxide with which is optionally mixed a water-miscible organic solvent. The component aqueous solution itself has an ammonium hydroxide molarity of at least about 5.0, preferably at least about 6.0, and more preferably at least about 8.0. The organic solvent can be any solvent that is miscible with water at levels up to about 200 volume percent, based on the water content of the above-mentioned aqueous solution. Examples of such solvents are acetone, ethyl acetate, and $C_2$–$C_4$ alkanols. Preferred are the alkanols, particularly isopropyl alcohol. The conditions under which the organic solvent is used depend on the identity of the metal whose oxide is to be co-produced with the zirconia and will be discussed more fully below. In general, whether or not the organic solvent is present, it is preferred that the ammonium hydroxide solution have a pH (or equivalent measure of basicity) of at least about 12.0, most preferably in the range of about 12.0–12.4.

When CHZ is used as the source of trioxydizirconium ion, an aqueous acidic solution of CHZ and the metal salt is prepared by first dissolving a strong acid in water, preferably distilled water, at a concentration sufficient to dissolve the intended amounts of zirconium compound and the other metal salt. Preferably, the acid concentration is sufficient to provide a pH of about 2.0 or below, and more preferably about 1.0 or below, to provide a solution in which the metal ions are homogeneously dissociated. With the exception of sulfuric acid, any suitably strong acid such as nitric, hydrochloric, or acetic acid can be used in this solution. Sulfuric acid should be avoided because of the relative insolubility of CHZ therein.

Many metal oxides can be co-produced with the zirconia according to the present invention by the introduction of that metal into the aqueous solution in conjunction with the trioxydizirconium ion. Generally, any salt can be used, but examples of preferred salts are nitrates, carbonates, chlorides, and acetates. The metal can be introduced as the salt of the same acid which is used to adjust the pH of the solution. The metal oxides preferred for co-production with the zirconia are those known to stabilize zirconia in its tetragonal form. Best known of these are yttrium oxide, magnesium oxide, and calcium oxide.

The amount of metal salt added to the solution in conjunction with the zirconium compound is that which, after precipitation and calcining, will generate the desired amount of corresponding metal oxide relative to the amount of zirconia. As particular examples, the amount of yttrium, magnesium, or calcium salt added to the acidic zirconium solution is that which will generate an amount of corresponding oxide, relative to the zirconia, sufficient to wholly or partially stabilize the zirconia. Zirconia is "wholly" or "partially" stabilized depending upon whether the amount of stabilizer is sufficient to form a solid solution in tetragonal and/or cubic phase with all or part of the zirconia. For calcia, as little as 4 weight percent, based on the total calcia and zirconia weight, is sufficient to partially stabilize the zirconia and as much as 10 weight percent may be needed to fully stabilize it. For magnesia and yttria, those corresponding ranges are 3–10% by weight and 4–16% by weight, respectively.

As mentioned, the identity of the metal oxide to be co-produced with the zirconia will control, in large part, whether or not the additional organic solvent need be added to the ammonium hydroxide solution. According to Table 1 below, if the aqueous solubility product ($K_{sp}$) of the hydroxide corresponding to the desired metal oxide is less than the value indicated in the table, the organic solvent need not be present. Examples of metals which can be so precipitated (that is, without the need for the organic solvent) are aluminum (III), beryllum (II), cadmium (II), cobalt (II), chromium (III), iron (III), indium (III), lanthanum (III), manganese (II), nickel (II), thorium (IV), titanium (IV), hafnium (IV), scandium (III), vanadium (IV), zinc (II) and all of the rare earth metals.

For the precipitation of those metal oxides whose corresponding hydroxides have a greater water-solubility than that indicated, the presence of the organic solvent will generally be required to reduce the capacity of the ammonium hydroxide solution to keep the metal hydroxide dissolved and to lead thereby to the quantitative precipitation of the metal hydroxide in conjunction with the precipitation of the zirconium hydroxide.

TABLE 1

| Metal Oxide Formula[1] | Corresponding Hydroxide Formula | $K_{sp}$[2] |
|---|---|---|
| MO | M(OH)$_2$ | $10^{-11}$ |
| M$_2$O$_3$ | M(OH)$_3$ | $10^{-16}$ |
| MO$_2$ | M(OH)$_4$ | $10^{-21}$ |

[1]M represents a metal atom
[2]$K_{sp}$ is the solubility product of the corresponding hydroxide in plain water at 20° C.

In the conduct of the present process, the basic ammonium hydroxide solution and the zirconium/metal solution are combined, most preferably by the slow addition of the zirconium solution to the ammonium hydroxide solution. It is important that in the resultant combination of solutions, the molar concentration of hydroxyl ions relative to the total molar concentrations of zirconium and other metal ions be maintained at a high level to insure that the metals quantitatively precipitate in the form of their hydroxides. In general, the characteristics of the two starting solutions are preferably such that the pH of the combined solution does not fall below about 9.0, and more preferably not below about 10.0. This can be accomplished by, for example, the presence of at least about 1.5 moles, preferably at least about 2.0 moles and more preferably at least about 3.0 moles, of ammonium hydroxide per each total mole of zirconium and other metal in the combined solution. It is also preferred that the volume of the zirconium/metal solution be no greater than about 50%, and preferably no greater than about 40%, of the volume of the ammonium hydroxide solution. With the use of the above parameters, or variations that would be evident to those skilled in the art, combining the two solutions results in the rapid and homogeneous precipitation of the hydroxides of zirconium and the other metal or metals.

At the completion of the precipitation, the solid residue can be recovered by standard techniques. Specifically, the solution can be filtered and the solid material washed, preferably first with water, then with an organic solvent miscible with water. Optionally, the resultant filter cake can be suspended in such a solvent, followed by re-filtration and re-washing with more solvent. The organic solvent washing is intended to remove as much sorbed (that is, non-chemically bound) water from the material as possible. The care with which the washing step is performed is important, and channeling in the solid material should be avoided so that the material is uniformly exposed to the washing fluid. The washed cake is then dried in an oven at a temperature up to about 150° C. In a preferred embodiment, the dried material is formed into a fine powder by, for example, pulverizing the dried cake, followed by grinding or milling.

In general, the recovery procedure importantly includes the removal of as much water from the precipitate as possible before further drying, to provide primary particles which are only weakly agglomerated and which sinter to high density. Although washing the precipitate with a water-miscible solvent, as described above, is advantageous, in a most preferred embodiment of the invention, the water-removal and drying steps of the recovery procedure are performed simultaneously and more thoroughly through evaporative distillation. More particularly, the washed filter cake is dispersed in an organic solvent with which water forms a low-boiling (that is, below about 100° C.) azeotrope, and the liquid (solvent plus any remaining sorbed water) then removed by distillation, for example by placing the dispersion in a closed distillation flask fitted with a condenser and then slowly heating the dispersion to evaporate and remove the liquid. It has been found that when this distillation/drying procedure is employed, the dried material is provided in the form of a substantially dry (that is, substantially free of sorbed water) fine powder having a primary particle size generally below about 100 angstroms. Accordingly, the need for grinding or milling the dried material, which not only is expensive but also can add impurities to the product, is eliminated. It has further been found that powders so produced, after calcining, can be sintered to a product with a density of greater than 99% of its theoretical density, and in preferred embodiments greater than about 99.3% of that density.

For example, a mixture of zirconia and yttria (4.33% by weight yttria) was prepared by the process of this invention. Drying was effected by the azeotropic distillation embodiment (using isopropanol as the water-miscible distillation solvent), followed by calcining for 24 hours at 850° C. Pellets of the material were subjected to isostatic pressing at 27,000 psi and sintered for 3 hours at 1450° C. to a density of 6.04 g/cm$^3$, versus a theoretical density of 6.08 g/cm$^3$. By way of comparison, the same mixture prepared by employing the drying procedure earlier described (that is, without the azeotropic distillation) was able to be sintered to a density of only 5.94 g.cm$^3$.

The organic solvent which can be employed in the azeotropic distillation procedure can be, as described above, any which forms a low-boiling azeotrope with water. Examples are xylene, toluene, acetone, methyl-ethyl ketone, lower alkyl acetates, and lower alkyl alcohols. Most preferred are xylene, toluene, ethanol, 2-butanol, and isopropanol, particularly the latter as it provides powders which have a primary particle size of about 50 angstroms and which have the highest sintered densities.

In the conduct of the distillation, some form of agitation of the dispersion in the distilling flask is employed to keep the solids well dispersed in the remaining liquid, to provide uniform heating, and to prevent bumping. It is also preferred to monitor the temperature of the super-heated vapors in the distillation flask. The temperatures generally will reach a maximum and then begin to fall. Heating is terminated when the temperature, after rising to a maximum, falls about 5° C. The drying of the filter cake using azeotropic distillation as described herein has utility beyond the particular zirconium mixtures of this invention, and can be useful for any similar application involving the drying of filter cakes in which removal of water and a product in the form of a fine powder are desired.

As a final step in the process, the recovered material is calcined, thereby generating the zirconia and adjuvant metal oxide from their respective hydroxides. Generally, conditions of 500°-900° C. for a period of 2-24 hours, preferably in an oxidizing atmosphere, are sufficient for the calcining step, although calcining at 800°-830° C. for 16-24 hours is preferred. As mentioned, it is also preferred that the material be sieved into a fine powder prior to calcining although that is not necessary. It has been found that some growth of the primary particles occurs during calcination, and for example, sizes of 200-400 angstroms can result from original primary particles of 50-100 angstrom size, but such growth does not adversely affect the pressing and sintering properties of the powders.

The zirconia mixtures produced in this manner contain less than about 0.01, and generally less than about 0.007, weight percent sodium oxide, based on the weight of the zirconia. Sodium content can be detected by flame emission spectroscopy. The zirconia materials produced according to the process of the present invention are useful for all applications for which zirconia mixtures have been used in the past.

The following examples are intended to be illustrative, but not limiting, of the claimed invention.

EXAMPLE 1

A slurry of 64 g of carbonated hydrous zirconia (26.7 g $ZrO_2$) in 500 ml of water was prepared in a one-liter beaker. The slurry was stirred, heated to incipient boiling, and filtered with suction through an 11-cm Buchner funnel. The resulting filter cake was washed three times with distilled water. Suction was continued until no more water filtrate passed through the funnel. The filter cake was placed in a 500-ml beaker to which was added 2.48 g of yttrium carbonate (which contained approximately 50% $Y_2O_3$). Into this beaker was slowly added 55 ml of 6M HCl, and the resultant mixture was stirred until all solids had dissolved, after which the resultant solution was filtered. The filtrate was transferred to a 250-ml separatory funnel, and the volume increased to 180 ml by the addition of distilled water. This solution was then added, drop-wise over a twenty-minute period, with stirring, to a separate beaker containing 500 ml of 6M ammonium hydroxide solution, resulting in the formation of a slurry containing a white precipitate. The slurry was filtered, with suction, through an 11-cm Buchner funnel, after which the filter cake was washed ten times with 50-ml portions of water and five times with 50-ml portions of isopropanol. Suction was continued until little or no filtrate came through.

Following the fifth isopropanol wash, the filter cake was dispersed in 500 ml of isopropanol in a 1000-ml beaker. The dispersion was transferred to a 1000-ml distilling flask equipped with a magnetic stirring bar, water-cooled condenser, and an electric heating mantle. Distillation was conducted, at 80°-81° C., at a rate sufficient to collect about 2-3 drops of distillate per second. After 450 ml of distillate had been collected, 100 ml of fresh isopropanol was added to the distilling flask. After an additional 100 ml of distillate had been collected, another 100-ml portion of isopropanol was added to the flask. The temperature of the distillate vapors increased to a maximum value in the range of 110°-120° C. after which that temperature dropped about 5° C. and the distillation was terminated. The solids remaining in the distillation flask were brushed through a 100-mesh sieve. The collected particles, in the form of a fine powder, were calcined for 16 hours at 850° C. Pellets of the powder (0.5 inch size) were prepared by uniaxially pressing the powder at 10,000 psi and then isostatically pressing at 27,000 psi. The pellets were heated in a furnace from room temperature to 1450° C. at a rate of 100° C./hour. The temperature was held at 1450° C. for three hours, after which the pellets were cooled to room temperature at a rate of 100° C./hour.

X-ray diffraction of the material shows the calcined material to be mostly tetraganol zirconia and that the sintered material is mostly tetraganol zirconia with some monoclinic zirconia present. In both cases, no yttria peaks appears in the x-ray diffraction pattern, indicating that all of the yttria is incorporated within the crystal lattice in the form of a solid solution with the zirconia. The fired densities of the pellets were in the range of 6.02–6.05 g/cm$^3$.

EXAMPLE 2

Several batches of material were prepared according to the procedure of Example 1 except that the identity of the acid in which the zirconium and yttrium compounds were dissolved and the calcination conditions were varied for each batch. All batches were prepared using amounts of CHZ and yttrium carbonate sufficient to provide a mixture of 4.33% by weight (2.42 mole %) yttria, balance zirconia, in the calcined material. The effects of the varying parameters on the surface area, particle size, and density of yttria-stabilized zirconia prepared by the procedures are shown in the following table.

| Dissolving Acid | Calcination (hours/°C.) | BET Surface Area (M/g) | Primary Particle Size (Å) | Density (g/cm$^3$) Green[a] | Density (g/cm$^3$) Sinter[b] |
|---|---|---|---|---|---|
| HCl | none | 309.8 | 50 | — | — |
| HCl | 2/850 | 50.2 | 200 | 2.46 | 6.03 |
| HCl | 24/850 | 37.9 | 300 | 2.54 | 6.04 |
| HNO$_3$ | none | 282.0 | — | — | — |
| HNO$_3$ | 24/850 | 37.6 | — | 2.56 | 6.03 |
| HCl | none | 280 | — | — | — |
| HCl | 16/850 | 41.0 | — | 2.56 | 6.03 |

[a]Average of three 0.5-inch pellets isostatically pressed at 27000 psi
[b]Average of three pellets; sintered by heating from room temperature to 1450° C. at 100° C./hour; holding at 1450° C. for three hours; cooling to room temperature at 100° C./hour.

EXAMPLE 3

Sixty-three grams of carbonated hydrous zirconia (41.7% ZrO$_2$) and 2.60 g of yttrium carbonate (containing approximately 52.5% Y$_2$O$_3$) were dissolved in 55 ml of 6M HCl. The solution was transferred to an evaporating dish which was placed on a steam bath. The solution was evaporated to complete dryness over a period of approximately twenty hours. The remaining solids were then dissolved in 100 ml of hot water, and this solution was filtered with suction through #42 filter paper, the paper being washed three times with water. The filtrate was transferred to a conical container and diluted to 180 ml with water and thoroughly mixed.

This solution was added dropwise, using a peristaltic pump, to 500 ml of 6M NH$_4$OH with stirring. When the addition was completed, the slurry was filtered with suction using #41 filter paper. The cake was washed ten times with 50-ml portions of water, ten times with 50-ml portions of acetone and ten times with 50-ml portions of xylene. During the filtration and washing, the cake was never allowed to run dry to prevent the formation of channels. Any channels that did form were sealed shut with a flat spatula. Suction was continued to remove the excess xylene from the cake.

The cake was removed from the Buchner funnel and placed in a 1000-ml beaker along with 500 ml xylene. The mixture was stirred vigorously for ten minutes to disperse the precipitate and was then transferred to a 1000-ml distilling flask containing a tetrafluoroethylene fluorocarbon polymer (Teflon ®, E. I. du Pont de Nemours and Company, Wilmington, Del.) coated stirring bar and fitted with a water-cooled condenser. The flask was surrounded with an electric heating mantle and placed on an electric stirring plate. The stirrer was activated, and the stirring was begun. The distillation was conducted at a rate to collect about two or three drops of distillate per second. After about 450 ml of distillate was collected, the stirrer was removed. The heating was continued until the temperature reached a maximum value, usually from 144° to 150° C., then dropped 5° C. At that time, the power to the heating mantle was terminated. The solids were removed from the flask and brushed through a 100-mesh sieve. The fine powder was calcined for 16 hours at 800° C. One-half-inch pellets were hydrostatically pressed at 7500 psi. The pellets were then sealed in a rubber bag and isostatically pressed at 35,000 psi. The pellets were heated in a MoSi$_2$ furnace from room temperature to 1380° C. at a rate of 100° C./hour, held at that temperature for three hours, and then cooled to room temperature at a rate of 100° C./hour. Fired densities, measured using the water-displacement method, were 6.06 g/cm$_3$.

EXAMPLE 4

Several batches of material were prepared according to the procedures of Example 3, except that different calcination conditions were used. The data in the following table show the effects of calcining at temperatures within the range of 680° to 980° C. for sixteen to twenty hours.

| Green and Fired Densities as Functions of Calcining Temperature | | |
|---|---|---|
| | Density, g/cm$^3$ | |
| Calcining Temp., °C. | Green | Fired (1380° C.) |
| 680 | 2.73 | 6.02 |
| 755 | 2.80 | 6.03 |
| 780 | 2.82 | 6.04 |
| 800* | 2.85 | 6.06 |
| 830 | 2.87 | 6.05 |
| 905 | 2.89 | 6.01 |
| 980 | 2.87 | 5.80 |

*Example 3
**The pellets were porous

The test results presented in the table above suggest that a calcining temperature of 800° C. is useful for providing a powder that will press to a satisfactory green density and sinter to a good dense body. The results further indicate that a calcining temperature too much in excess of 830° C. is unsatisfactory.

What is claimed is:

1. A process for the preparation of a mixture of zirconia with at least one other metal oxide consisting essentially of:
    (a) providing a first solution of either (i) an aqueous solution of NH4OH having a molarity of at least about 5.0, or (ii) an aqueous solution of NH4OH having a molarity of at least about 5.0 and a water miscible organic solvent;
    (b) providing a second aqueous solution consisting essentially of trioxidizirconium ion and at least one other metal salt;
    (c) adding the second aqueous solution to the first solution to precipitate substanially all the zirconium and the other metal in the form of their hydroxides;
    (d) recovering the precipitated material; and
    (e) calcining the material.

2. The process of claim 1 where said second aqueous solution is an acidic aqueous solution of carbonated hydrous zirconia and said at least one other metal salt.

3. The process of claim 1 where said second aqueous soltion is prepared by evaporating to dryness either an aqueous solution of a Zr(IV) salt or an aqueous solution of a Zr(IV) salt in the presence of at least one other metal salt, and forming an aqueous solution of the resulting salts.

4. The process of claim 1 where said second aqueous solution is prepared by adding ammonium carbonate to either an aqueous solution of a Zr(IV) salt or to an aqueous solution of a Zr(IV) salt and said at least one other metal salt, in an amount effective to adjust the pH of said solution to about 1.

5. The process of claim 1 where said second aqueous solution is prepared by adding ammonium carbonate to either an aqueous solution of a Zr(IV) salt or to an aqueous solution of a Zr(IV) salt and said at least one other metal salt, in an amount effective to adjust the pH of said solution to about 1, followed by evaporating said solution to dryness and forming an aqueous solution of the resulting salts.

6. The process of claim 2 where said excess acid is removed from said second aqueous solution prior to adding said second solution to said first solution.

7. The process of claim 1 where the concentration of Zr(IV) in said second aqueous solution is no greater than approximately 11 weight/volume % of said solution.

8. The process of claim 1 in which said other metal salt is a salt of yttrium, magnesium, or calcium.

9. The process of claim 2 in which said other metal salt is a salt of yttrium, magnesium or calcium.

10. The process of claim 1 in which the aqueous solution of NH4OH has a molarity of at least about 6.0.

11. The process of claim 2 in which the aqueous solution of NH4 has a molarity of at least about 6.0.

12. The process of claim 1 in which the aqueous solution of NH4OH has a molarity of at least about 8.0.

13. The process of claim 10 in which the aqueous solution of NH4OH has a molarity of at least about 6.0; the metal salt is a salt of nitric, hydrochloric, carbonic, or acetic acid; and said second solution is acidified with hydrochloric or nitric acid.

14. The process of claim 11 in which the aqueous solution of NH4OH has a molarity of at least about 6.0; the metal salt is a salt of nitric, hydrochloric, carbonic, or acetic acid; and said second solution is acidified with hydrochloric or nitric acid.

15. The process of claim 13 in which the aqueous solution of NH4OH has a molarity of at least about 8.0.

16. The process of claim 14 in which the aqueous solution of NH4OH has a molarity of at least about 8.0.

17. The process of claim 1 in which said recovery step includes forming the precipitated material into a powder.

18. The process of claim 2 in which said recovery step includes forming the precipitated material into a powder.

19. The process of claim 8 in which said recovery step includes forming the precipitated material into a powder.

20. The process of claim 13 in which said recovery step includes forming the precipitated material into a powder.

21. The process of claim 1 in which said recovery step includes the steps of
    (1) filtering the precipitated material;
    (2) washing the filtered material,
    (3) dispersing the material in an organic solvent with which water forms a low-boiling azeotrope; and
    (4) removing the organic solvent and substantially all remaining sorbed water from the dispersion by distillation to provide the material in the form of a substantially dry powder.

22. The process of claim 21 in which said other metal salt is a salt of yttrium, magnesium, or calcium.

23. The process of claim 21 in which the azeotrope-forming organic solvent is toluene, xylene, isopropanol, ethanol, or 2-butanol.

24. The process of claim 23 in which the azeotrope-forming organic solvent is toluene or xylene.

25. The process of claim 21 in which the aqueous solution of NH4OH has a molarity of at least about 6.0.

26. The process of claim 25 in which the aqueous solution of NH4OH has a molarity of at least about 8.0.

27. The process of claim 21 in which the aqueous solution of NH4OH has a molarity of at least about 6.0; the metal salt is a salt of nitric, hydrochloric, carbonic, or acetic acid; and said second solution is acidified with hydrochloric or nitric acid.

28. The process of claim 27 in which the aqueous solution of NH4OH has a molarity of at least about 8.0.

29. The process of claim 27 in which the metal salt is yttrium carbonate.

30. The process of claim 29 in which the azetrope-forming organic solvent is toluene, xylene, isopropanol, ethanol, or 2-butanol.

31. The process of claim 30 in which the azeotrope-forming organic solvent is toluene or xylene.

32. A mixture of zirconia with at least one other metal oxide prepared according to the process of claim 1, said mixture containing less than 0.01% by weight, based on the zirconia weight, of sodium oxide.

33. A mixture of ziconia with at least one other metal oxide prepared according to the process of claim 2, said mixture containing less than 0.01% by weight, based on the zirconia weight, of sodium oxide.

34. A mixture of zirconia with at least one other metal oxide prepared according to the process of claim 8, said mixture containing less than 0.01% by weight, based on the zirconia weight, of sodium oxide.

35. A mixture of zirconia with at least one other metal oxide prepared according to the process of claim 13, said mixture containing less than 0.01% by weight, based on the zirconia weight, of sodium oxide.

36. A mixture of zirconia with at least one other metal oxide prepared according to the process of claim 21, said mixture containing less than 0.01% weight, based on the zirconia weight, of sodium oxide.

37. A mixture of zirconia with at least one other metal oxide prepared according to the process of claim 27, said mixture containing less than 0.01% by weight, based on the zirconia weight, of sodium oxide.

38. A mixture of zirconia and yttria prepared according to the process of claim 29, said mixture containing less than 0.01% by weight, based on the zirconia weight, of sodium oxide.

* * * * *